(12) United States Patent
Dottavio et al.

(10) Patent No.: US 6,173,939 B1
(45) Date of Patent: Jan. 16, 2001

(54) ELECTRONIC THROTTLE CONTROL SYSTEM WITH TWO-SPRING FAILSAFE MECHANISM

(75) Inventors: James J. Dottavio, Granville, OH (US); Mark Warner Semeyn, Ypsilanti, MI (US); Edward Albert Bos, Ann Arbor, MI (US); Mark Alan Saunders, Saline, MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/438,122

(22) Filed: Nov. 10, 1999

(51) Int. Cl.⁷ .................................................. F16K 31/02

(52) U.S. Cl. .............................. 251/129.12; 251/250.5; 251/305; 123/339.15

(58) Field of Search ........................ 251/129.12, 250.5, 251/305; 123/339.15, 361, 337

(56) References Cited

U.S. PATENT DOCUMENTS

| | | |
|---|---|---|
| 2,924,424 | 2/1960 | Tittering . |
| 3,924,596 | 12/1975 | Klemm . |
| 4,008,877 | 2/1977 | Yasuoka . |
| 4,601,271 | 7/1986 | Ejiri et al. . |
| 4,827,884 | 5/1989 | Cook . |
| 4,838,226 | 6/1989 | Matsuzawa . |
| 4,840,349 * | 6/1989 | Peter et al. ........................ 251/129.11 |
| 4,848,505 | 7/1989 | Yoshizawa . |
| 4,873,954 | 10/1989 | Codling . |
| 4,879,657 | 11/1989 | Tamura et al. . |
| 4,892,071 | 1/1990 | Asayama . |
| 4,947,815 | 8/1990 | Peter . |
| 4,951,772 * | 8/1990 | Peter et al. ........................... 123/361 |
| 4,961,355 | 10/1990 | Irino . |
| 4,986,238 | 1/1991 | Terazawa . |
| 4,991,552 | 2/1991 | Luft et al. . |
| 5,014,666 | 5/1991 | Westenberger . |
| 5,018,496 | 5/1991 | Buchl . |
| 5,036,816 * | 8/1991 | Mann ................................... 123/361 |
| 5,038,733 | 8/1991 | Westenberger . |
| 5,078,110 | 1/1992 | Rodefeld . |
| 5,092,296 * | 3/1992 | Gunter et al. ........................ 251/305 |
| 5,103,787 | 4/1992 | Bassler et al. . |
| 5,113,822 | 5/1992 | Asayama . |
| 5,148,790 | 9/1992 | Hickman et al. . |
| 5,161,508 | 11/1992 | Zentgraf et al. . |
| 5,168,852 | 12/1992 | Moriguchi . |
| 5,168,951 | 12/1992 | Sugiura . |
| 5,259,349 | 11/1993 | Radinski . |
| 5,265,572 | 11/1993 | Kadomukai . |
| 5,275,375 | 1/1994 | Semence . |
| 5,295,907 * | 3/1994 | Akkerman ...................... 251/129.11 |
| 5,297,521 | 3/1994 | Sasaki . |
| 5,297,522 | 3/1994 | Buchl . |
| 5,325,832 | 7/1994 | Maute . |
| 5,423,299 | 6/1995 | Kumagai . |
| 5,429,090 | 7/1995 | Kotchi . |
| 5,492,097 | 2/1996 | Wojts-Saary et al. . |
| 5,517,966 * | 5/1996 | Kanazawa et al. ............. 251/129.11 |
| 5,630,571 | 5/1997 | Kipp . |

(List continued on next page.)

FOREIGN PATENT DOCUMENTS

| | | |
|---|---|---|
| 0 574 093 | 6/1991 | (EP) . |
| 2217 389 | 10/1989 | (GB) . |
| 2 233 038 | 1/1991 | (GB) . |

*Primary Examiner*—Kevin Shaver
*Assistant Examiner*—D A Bonderer
(74) *Attorney, Agent, or Firm*—Jerome R. Drouillard

(57) ABSTRACT

An electronic throttle control system having a housing 22 with a motor 40, throttle valve 60, gear mechanism 100, and failsafe mechanism 130. A spring member 150 attached between the housing 22 and a gear member 104 attached to the throttle valve shaft 62 biases the throttle plate 60 towards the closed position. A spring-biased plunger member 134 biases the throttle plate 60 from its closed position to a default or "limp-home" position.

15 Claims, 5 Drawing Sheets

U.S. PATENT DOCUMENTS

| | | | |
|---|---|---|---|
| 5,687,691 | * 11/1997 | Kaiser et al. | 251/305 |
| 5,752,484 | 5/1998 | Apel . | |
| 5,775,292 | 7/1998 | Seeger . | |
| 5,868,114 | * 2/1999 | Kamimura et al. | 123/399 |
| 5,996,551 | * 12/1999 | Schroder | 123/337 |
| 6,000,377 | * 12/1999 | Sato et al. | 123/337 |
| 6,070,852 | * 6/2000 | McDonnell et al. | 251/129.11 |
| 6,095,488 | * 8/2000 | Semeyn, Jr. et al. | 251/129.12 |

* cited by examiner

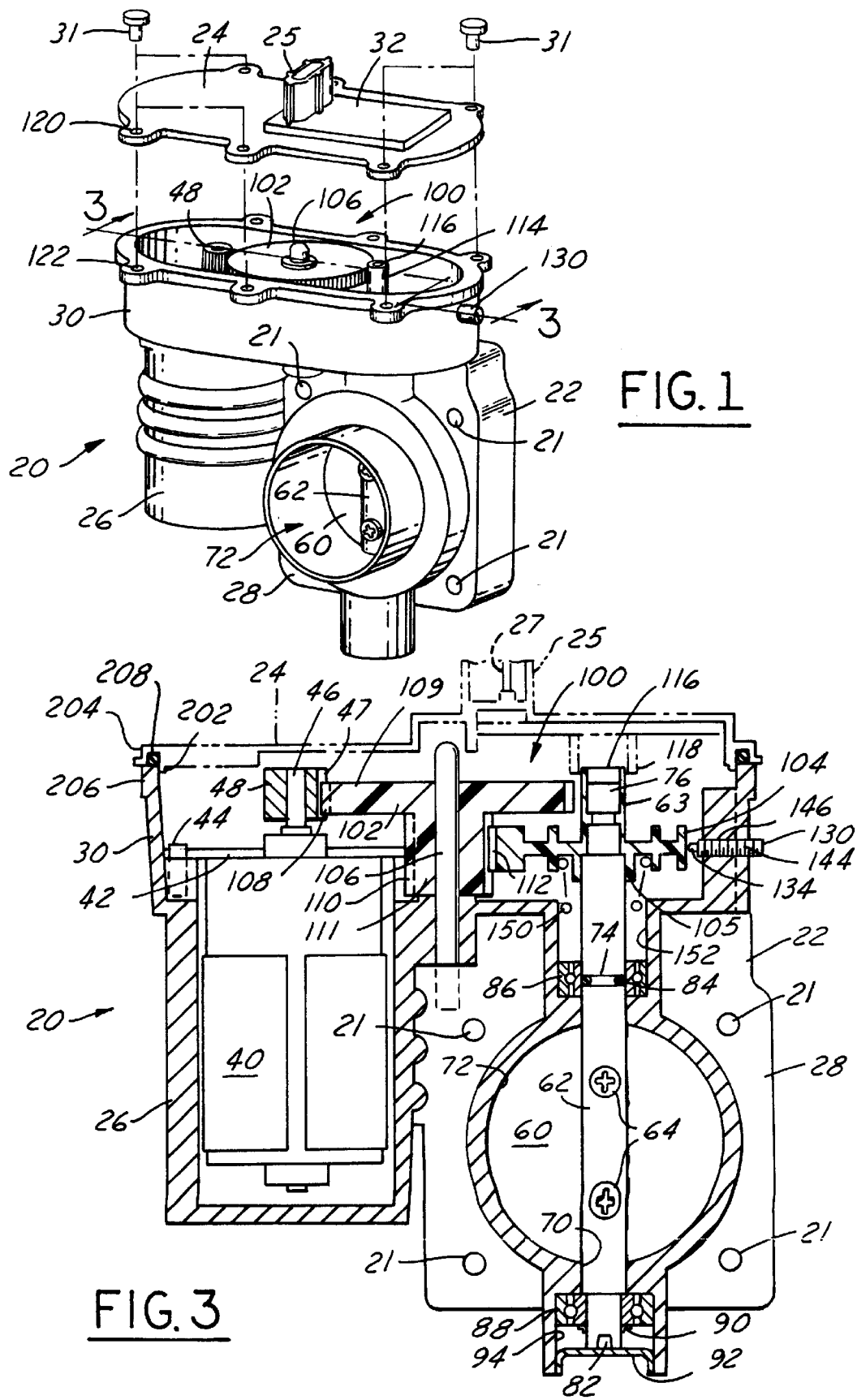

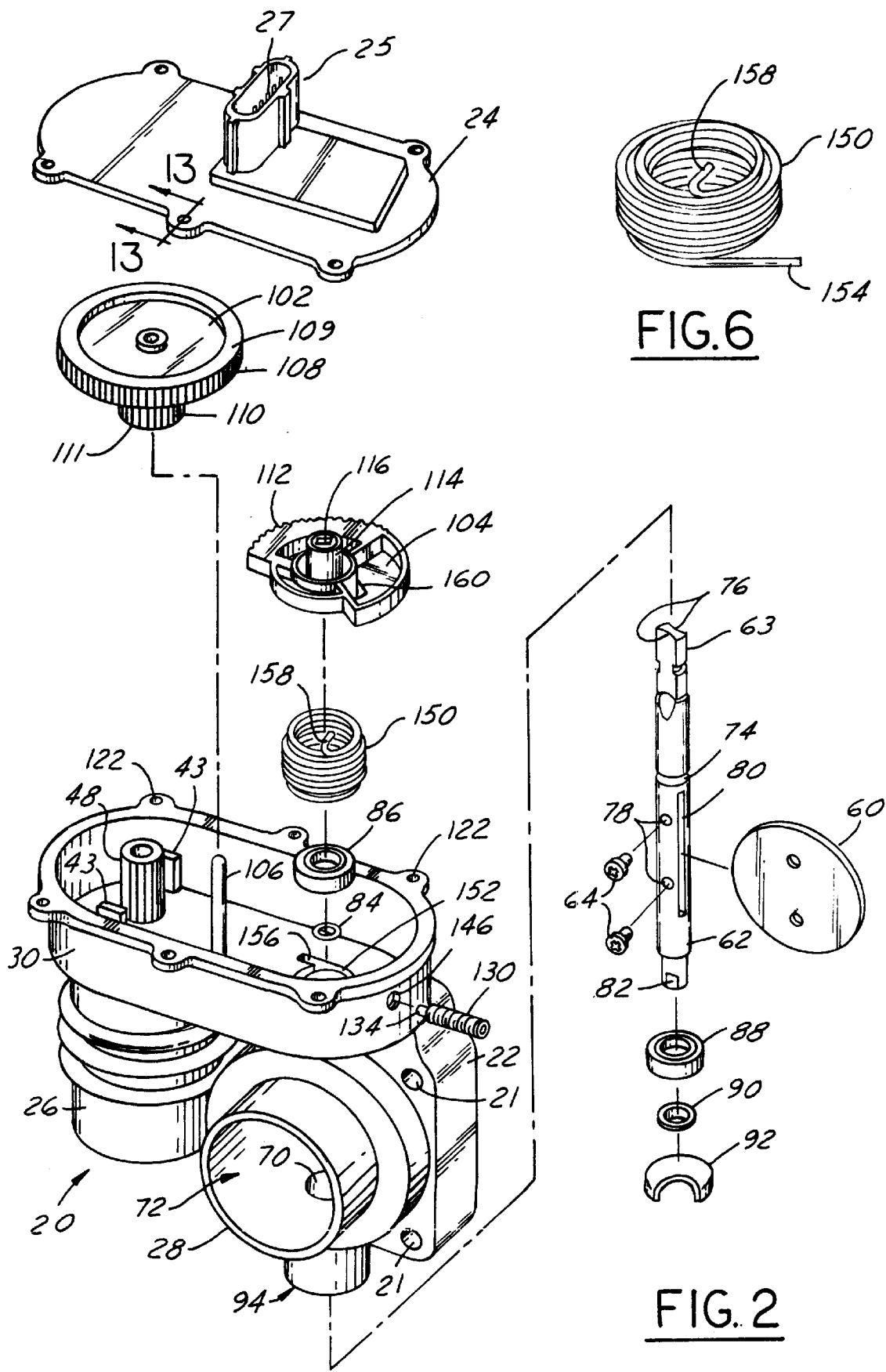

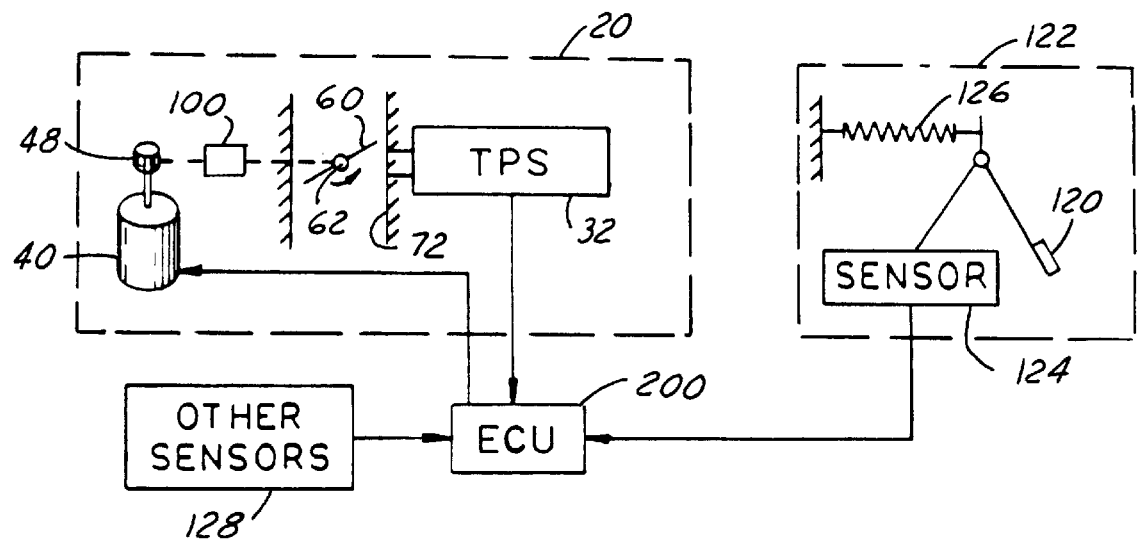
FIG.11
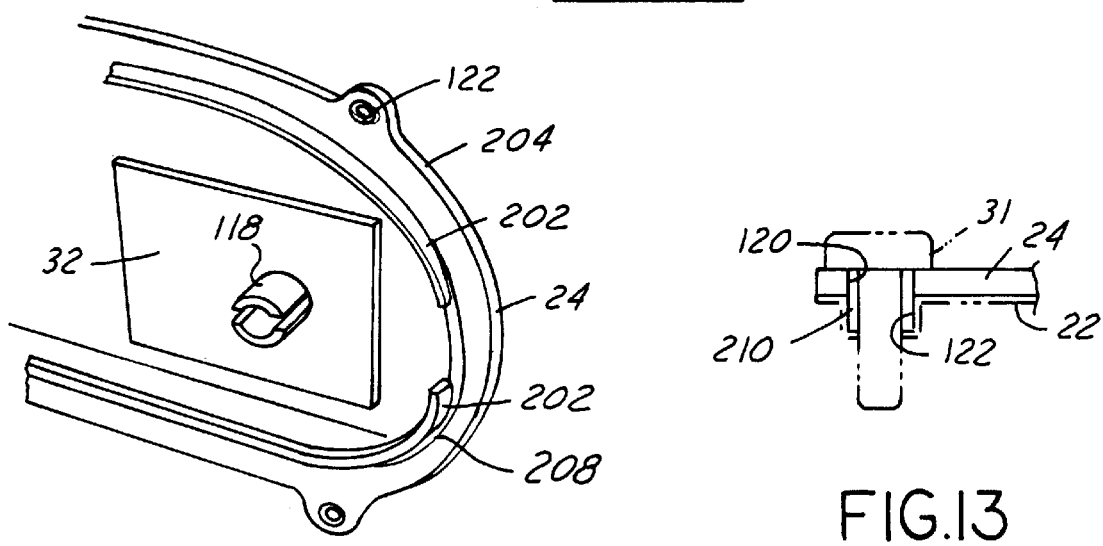
FIG.12
FIG.13

ELECTRONIC THROTTLE CONTROL SYSTEM WITH TWO-SPRING FAILSAFE MECHANISM

CROSS-REFERENCE TO RELATED APPLICATIONS

The present application is related to the following patent applications which are co-owned by the same assignee and filed on the same date herewith: "Electronic Throttle Return Mechanism With Default And Gear Backlash Control," Ser. No. 09438576; "Electronic Throttle Return Mechanism With A Two-Spring And One Lever Default Mechanism," Ser. No. 09438162; and "Electronic Throttle Return Mechanism With A Two-Spring And Two-Lever Default Mechanism," Ser. No. 09438161.

TECHNICAL FIELD

This invention relates to electronic valve control systems and more particularly to an electronic throttle control system for an internal combustion engine.

BACKGROUND

Valve assemblies for engines and related systems typically utilize rotatable valve members in fluid flow passageways to assist in regulating fluid flow through them. For example, throttle valve members are positioned in the air induction passageways into internal combustion engines. The valve assemblies are controlled either mechanically or electronically and utilize a mechanism which directly operates the valve member.

For electronic throttle control systems, it is desirable to have a failsafe mechanism or system which activates the throttle valve in the event that the electronic control or electronic system of the vehicle fails. There are known electronic throttle control systems which have failsafe mechanisms for closing the throttle valve or moving it to a slightly open position in the event of an electronic failure in the vehicle. Some of these mechanisms utilize one, two or more spring members in order to activate the failsafe mechanism.

It would be desirable to have an electronic valve control system with an improved failsafe or limp-home mechanism and which provides an improved assembly and system with reduced cost and improved reliability.

SUMMARY OF THE INVENTION

The present invention provides an electronic throttle control assembly having a housing with a motor, a gear train and throttle valve. A throttle plate is positioned on a throttle shaft and the plate and shaft are positioned in the engine or air induction passageway, such that the throttle plate regulates airflow into the engine.

The operation of the throttle valve is accomplished by a gear train assembly driven by a reversible DC motor. The motor is regulated by the electronic control unit of the vehicle which in turn is responsive to the input of the vehicle operator or driver. A throttle position sensor is included in a housing cover and feeds back the position of the throttle plate to the electronic control unit.

In the operation of the throttle valve, a gear connected to the motor operates an intermediate gear, which in turn operates a sector gear which is connected to the throttle body shaft. The sector gear is biased by a spring member towards the closed position of the throttle valve. As a failsafe mechanism, a spring-biased plunger member is attached to the housing and positioned to interrupt operation of the sector gear and prevent the throttle valve from closing completely.

If the throttle valve is in its closed position when an electronic failure occurs, the springbiased plunger member acts on the sector gear to open the throttle valve slightly to a failsafe position. At the failsafe position, the vehicle can still be operated, although at a reduced capacity. This allows the driver to "limp-home."

Other features and advantages of the present invention will become apparent from the following description of the invention, particularly when viewed in accordance with the accompanying drawings and appended claims.

BRIEF DESCRIPTION OF THE DRAWINGS

FIG. 1 illustrates an electronic throttle control assembly in accordance with the present invention;

FIG. 2 is an exploded view of the electronic throttle control assembly of FIG. 1;

FIG. 3 is a cross-sectional view of the electronic throttle control assembly of FIG. 1, the cross-section being taken along line 3—3 in FIG. 1 and in the direction of the arrows;

FIG. 6 illustrates an embodiment of a spring member which can be utilized with the present invention;

FIG. 11 is a schematic illustration showing a representative circuit which can be utilized with the present invention; and FIGS. 12 and 13 illustrate additional features of a cover member in accordance with an embodiment of the invention, with FIG. 13 being a partial cross-sectional view taken along line 13—13 in FIG. 2.

DESCRIPTION OF THE PREFERRED EMBODIMENT(S)

Figure 4:
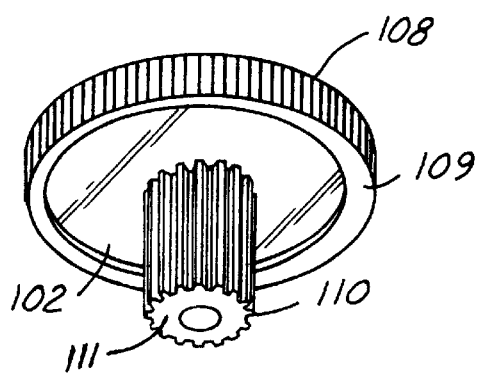
FIG. 4 depicts an intermediate gear member which can be utilized with the present invention.

FIGS. 1–3 illustrate a preferred embodiment of an electronic throttle control assembly in accordance with the present invention, while FIGS. 4–13 illustrate various components of the assembly and the operation thereof. As to FIGS. 1–3, FIG. 1 illustrates the assembly 20 in its assembled form, FIG. 2 illustrates the components of the assembly in an exploded condition, and FIG. 3 is a cross-sectional view of the assembly 20 as shown in FIG. 1.

The electronic throttle control assembly 20 includes a housing or body member 22 and a cover member 24. The housing 22 includes a motor section 26, a throttle valve section 28, and a gear train section 30. The cover member 24 includes the throttle position sensor (TPS) 32, together with related electronics, which reads or "senses" the position of the throttle valve and transmits it to the electronic control unit (ECU) 200 of the vehicle (see FIG. 11). In order to connect the ECU to the TPS, an electrical connector member 25 is positioned on the cover member 24. The connector member preferably has six contacts 27: two to the motor 40 which regulates the position of the throttle valve; and four to the TPS and related electronics. The connector member 25 can be positioned on the top of the cover as shown, or it can be located at other positions due to packaging and access considerations, such as along an edge. The contacts 27 can also extend at an angle from the cover, or downwardly if the connector member is positioned at the side or edge of the cover.

When the driver or operator of the vehicle presses the vehicle accelerator, the electronic control unit (ECU) sends a signal to the motor 40 which in turn operates the gear train 100 and adjusts the position of the throttle valve 60. The throttle valve is positioned in the main air passageway 72 from the air intake inside the engine compartment to the internal combustion engine. The precise position of the throttle valve in the airflow passageway is sensed by the TPS and relayed or fed back to the ECU in order to confirm or adjust the desired throttle valve setting. The throttle valve thus regulates the airflow to the internal combustion engine and in turn the speed of the engine and velocity of the vehicle.

The cover member can be attached to the body member 22 in any conventional manner, but preferably is connected by a plurality of fastener members, such as screws or bolts 31. For this purpose, a series of openings 120 are provided in the cover member for mating with a series of sockets 122 on the gear section 30 of the housing 22. The sockets 122 can be threaded in order to securely hold the cover in place or threaded nuts could be utilized. Also, an appropriate gasket or sealing member (not shown) is preferably positioned between the cover member and the housing in order to protect the gear train and TPS from dirt, moisture and other environmental conditions. When the electronic throttle control assembly 20 is utilized, it is positioned in the engine compartment of the vehicle and bolted or otherwise securely fastened to the vehicle. For this purpose, a plurality of holes 21 are provided in the housing.

The motor 40, as best shown in FIG. 3, is a reversible thirteen volt DC motor. The motor 40 is connected to a mounting plate 42 which is bolted or otherwise securely fastened to the body member 22 by a plurality of bolts, screws, or other fasteners 44. The plate 42 also has a pair of contacts 43, as shown in FIG. 2, which electrically connect the electronics in the cover member 24 to the motor 40.

The motor 40 has a shaft 46 on which a small spur gear 48 is positioned. The gear 48 has a plurality of teeth 47 which mesh with and rotate adjacent gears, as described below. The throttle valve or plate 60 is secured to a throttle body shaft 62 which in turn is positioned in the throttle section 28 of the body member or housing 22. The throttle plate 60 is secured to the throttle body shaft 62 by a plurality of small fasteners or plate screws 64. The throttle shaft 62 is positioned in a bore or channel 70 in the throttle section of the body member 22. The bore 70 is transverse to the axis of the air flow passageway 72.

Throttle shaft 62 has an O-ring channel or groove 74, a pair of flats or recesses 76 at the upper end for connection to one of the gears (as explained below), a pair of openings 78 for positioning of the plate screws therethrough, an axial or longitudinally extending slot 80 for positioning of the throttle plate 60 therein, and a pair of flats or recesses 82 at the lower end for use in assembling and positioning the throttle valve. The flats 82 are utilized to rotate the throttle shaft 62 during assembly of the throttle plate and also for orientation of the sector gear during the molding or attachment process.

An O-ring 84 is positioned in the channel 74 on the throttle shaft. The O-ring 84 provides a seal between the air in the air flow passageway 72 and the gear train components and electronics in the cover. For assembly of the throttle body shaft and throttle plate in the assembly 20, the throttle body shaft 62 is first positioned in the bore 70 and rotated in order to allow the plate 60 to be positioned in slot 80. The throttle body shaft 62 is then turned approximately 90 degrees in order to allow the throttle plate screws 64 to be secured through the shaft and plate, thereby securely affixing the plate to the shaft.

When the throttle body shaft 62 is positioned in the housing 22, a pair of bearings 86 and 88 are provided to allow the throttle body shaft to rotate freely in the housing. The bearings 86 and 88 are conventional ball-bearing members with pairs of races separated by small balls.

As shown in FIG. 3, once the throttle body shaft 62 is positioned in the body member 22 (and before the throttle plate 60 is secured to it), an axial retainer clip member 90, preferably made of a spring steel material, is secured to the lower end of the shaft. The retainer clip member 90 holds the throttle body shaft 62 securely in position in the throttle section 28 of the body or housing member 22 and minimizes axial or longitudinal movement (or "play") of the shaft 62 in the housing.

During assembly, the clip member 90 is pushed or forced onto the shaft 62 until it contacts the inner race of bearing 88. The throttle body shaft, being stepped in diameter, is then fixed axially to the inner rate of the bearing. A spring clip member could also be utilized in order to pre-load the bearings to minimize radial movement of the shaft and also minimize axial movement of the shaft in the assembly 22.

Once the retainer clip member 90 is installed in position and the throttle plate is attached to it, an end cap member or plug member 92 is positioned enclosing the cavity 94. This protects the lower end of the shaft from moisture, dirt and other environmental conditions which might adversely affect the operation of the throttle valve. This step is typically the last step in the assembly process since the end of the shaft 62 is left exposed until after all end-of-the-line testing has been completed.

Figure 5:
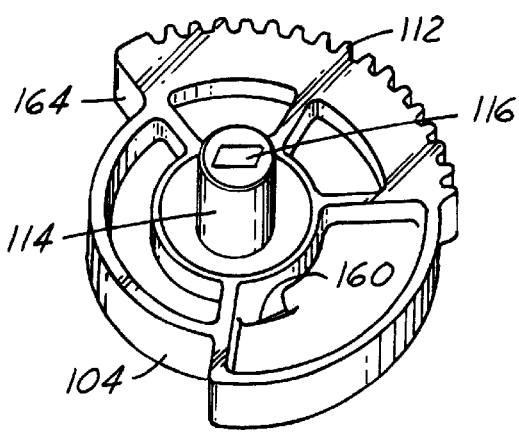
FIG. 5 illustrates a sector gear member which can be utilized with the present invention.

The gear assembly or gear train mechanism used with the electronic control assembly 20 in accordance with the present invention is generally referred to by the reference numeral 100. The gear train mechanism 100 includes spur gear 48 attached to motor 40, an intermediate gear member 102 (FIG. 4), and a sector gear member 104 (FIG. 5). The intermediate gear member 102 is mounted on a shaft member 106 which is secured to the housing or body member 22 (see FIGS. 1–3). The intermediate gear member 102 rotates freely on shaft 106.

The intermediate gear member 102 has a first series of gear teeth 108 on a first portion 109 and a second series of gear teeth 110 on a second portion 111. The gear teeth 108 on gear 102 are positioned to mesh with the gear teeth 47 on the motor driven gear 48, while the gear teeth 110 are positioned and adapted for mating with the gear teeth 112 on the sector gear 104. As shown in the drawings, the teeth 112 on gear 104 are only provided on a portion or sector of the outside circumference of the gear member.

All of the gear members 48, 102 and 104 are preferably made of a plastic material, such as nylon, although they can be made of any other comparable material, or metal, which has equivalent durability and function.

The sector gear 104 is preferably molded onto the end 63 of the throttle body shaft 62. For this purpose, recesses 76 are provided on the shaft 62 to allow the sector gear to be integrally molded to the shaft and be permanently affixed thereto. Also, the lower end 105 of the sector gear can be extended in order to contact the inner race of bearing 86, thus helping to hold the throttle body shaft axially in position.

The sector gear 104 has a central portion or member 114 which extends above the gear train 100 for communication with the throttle position sensor (TPS) mechanism 32 in the cover member 24. In order for the TPS to read the position of the throttle valve plate 60, the TPS must be able to correctly sense or read the movement and rotation of the throttle body shaft 62.

For this purpose, two opposing flats are positioned on the upper end of the central member 114. The hub of the TPS is press-fit onto these flats and thus the position of the throttle shaft can be read accurately without relative movement between the TPS and the shaft.

In the operation of the electronic throttle valve assembly, the force applied to the accelerator pedal 120 by the operator of the vehicle 122 is read by a sensor 124 and conveyed to the ECU 200 (see FIG. 11). The accelerator pedal 120 is typically biased by a spring-type biasing member 126 in order to provide tactile feedback to the operator. The ECU of the vehicle also receives input from a plurality of other sensors 128 connected in other mechanisms and systems in the vehicle.

In order to operate the throttle valve plate 62, a signal from the ECU 200 is sent to the motor 40. The motor rotates the spur gear 48 which then operates the gear train mechanism 100. More specifically, the gear member 48 rotates the intermediate gear member 102, which in turn rotates the sector gear member 104. This in turn causes the throttle body shaft 62, which is fixedly attached to the gear member 104, to rotate. Rotation of shaft 62 accurately positions the valve plate 62 in the passageway 72 and allows the requisite and necessary air flow into the engine in response to movement of the accelerator pedal 120.

The present invention also has a failsafe (a/k/a "limp-home") mechanism which allows the throttle valve plate to remain partially open in the event of a failure of the electronics system in the throttle control mechanism or in the entire vehicle. For the "failsafe" mechanism of the present electronic throttle control assembly 20, a spring-biased plunger mechanism 130 is provided and is utilized in combination with the sector gear member 104.

Figure 7:
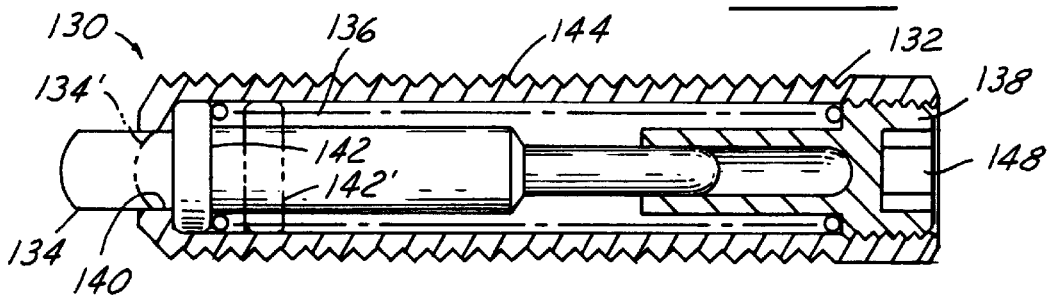
FIG. 7 illustrates a spring-biased plunger member which can be utilized with the present invention.

The mechanism 130, as shown in more detail in FIG. 7, has an elongated hollow body or housing 132, a plunger member 134, a spring member 136 and a plug or end member 138. The plunger member 134 is slidingly positioned in opening 140 in one end of the housing. The plug member 138 is fixedly positioned in the other end of the housing (in any conventional manner, such as press-fit, gluing, staking, threads, etc.). The spring member 136 is positioned in a preloaded condition between end 142 of the plunger member 134 and the plug member 138. The spring member 136 biases the plunger member to the position shown in FIG. 7 with the length of the plunger member fully extended. When the plunger member 134 is depressed, the plunger member 134 (and its end 142) are moved against the force of the spring member 136 to the positions 134' (and 142') as indicated in phantom lines in FIG. 7.

The outer surface of the body 132 of the plunger mechanism 130 has a plurality of thread members 144 which are adopted to mate with corresponding threads in opening 146 in the housing 22. In this manner, the position of the plunger mechanism 130 in the housing 22 and the extent to which the plunger member 134 extends into the gear train section 30, can be adjusted to facilitate proper and optimum operation of the throttle valve and failsafe mechanism. This also adjusts the angle of the throttle valve at the failsafe position. Also, the body 132 of the plunger mechanism serves as an adjustable hard stop for the closed position when the plunger is fully depressed. A hex socket 148 on the end of the body member 132 allows for such adjustment with a wrench or other comparable tool. Other mechanical mechanisms, such as slots for screwdrivers and the like, could also be used for this purpose.

The spring-biased plunger mechanism 130, in combination with the sector gear 104, as well as with spring member 150 (described below) act together to limit and control the operation of the valve plate member 60 and the failsafe mechanism.

A helical torsion spring member 150 is positioned in recess or pocket 152 in the housing 22. The spring member 150 is positioned around the valve shaft member 62 as shown in FIG. 3 and acts to bias the sector gear 104 (and thus the valve or throttle plate member 60) relative to the housing 22. For this purpose, one end 154 of the spring member is fixedly positioned in slot 156 in the housing and the other end 158 of the spring member is bent and positioned in opening 160 in the sector gear 104.

Figure 8:
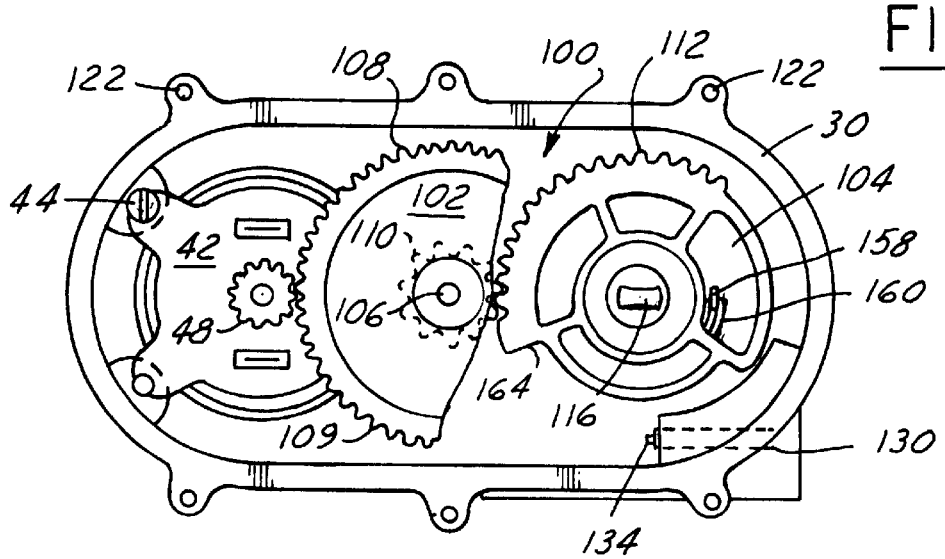
FIGS. 8, 9, and 10 illustrate the range of operation of a gear train in accordance with one embodiment of the present invention.
Figure 8A:
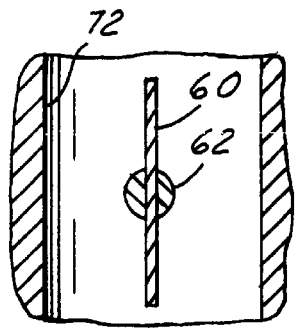
FIGS. 8A, 9A and 10A illustrate the positioning of the throttle valve plate during the range of operation of the present invention.

When installed and assembled, the spring member 150 biases the valve plate member 60 towards its closed position. Thus, when the shaft member 62 and sector gear 104 are rotated by the motor 40 and gear train mechanism 100 to the fully open position of the throttle plate 60, as shown in FIGS. 8 and 8A, the spring member 150 is biased to return the valve or throttle plate member 60 to or towards the closed position. In the open position, the throttle plate 60 is positioned approximately parallel with the axis of the passageway 72 thus allowing a full compliment of air to pass into the engine. In this manner in the event of an electronic failure in the throttle control assembly 20 when the throttle valve is open (i.e., when the accelerator pedal is depressed and the vehicle is moving at a significant velocity), the failsafe mechanism will automatically act to close the throttle valve in order to reduce the speed of the engine and the velocity of the vehicle.

Figure 9:
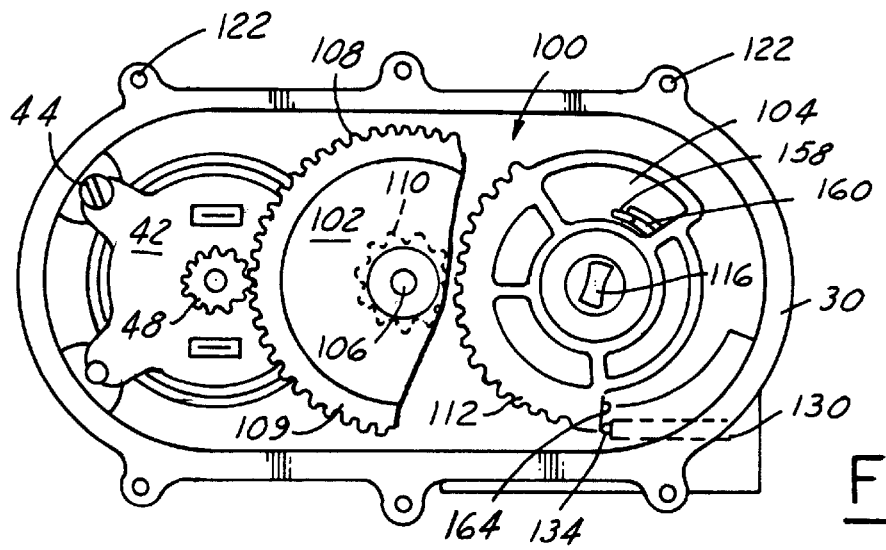
Figure 9A:
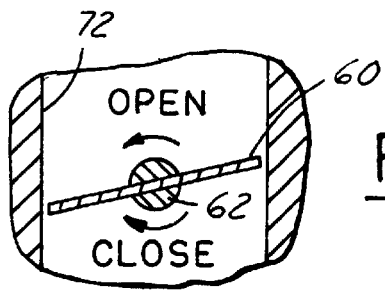

The plunger mechanism 130 prevents the throttle valve from closing completely. The plunger mechanism 130 acts to position the throttle valve in a slightly open position, thus allowing the vehicle to operate at a reduced speed and "limp-home." For this purpose, the sector gear member 104 has a stop shoulder 164 thereon. The plunger mechanism 130 is positioned such that the stop shoulder 164 contacts the plunger member 134 before the throttle plate reaches the fully closed position. The force or bias of the spring member 136 in the plunger mechanism 130 is stronger or greater than the force or bias of the helical torsion spring member 150, and thus the plunger mechanism 130 stops and prevents the sector gear from rotating any further. The position of the sector gear and plunger mechanism at this point of operation is shown in FIG. 9. The resultant default or "limp-home" position of the throttle plate member 60 is shown in FIG. 9A. When the valve or throttle plate member is in the default position, it is opened about 5°–10° from the throttle valve's closed position.

In many engines known today, the throttle plate is manufactured and assembled to have a slight inclination on the order of 7°–10° in the fully closed position. This is to assure proper functioning of the valve plate in all conditions and prevent it from sticking or binding in the closed position. Also, using the body of the plunger as a hard stop slightly before the plate closes in the bore further prevents sticking and binding of the throttle plate in the closed position. Thus, in the default or "limp-home" position, the throttle plate will be about 12°–20° from a position transverse to the axis of the air flow passageway.

Figure 10:
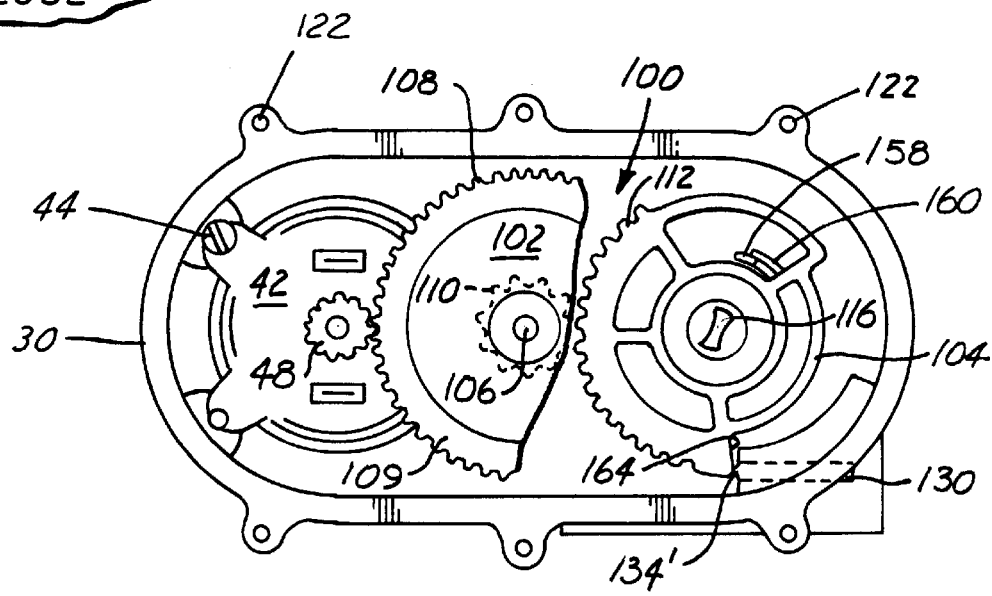
Figure 10A:
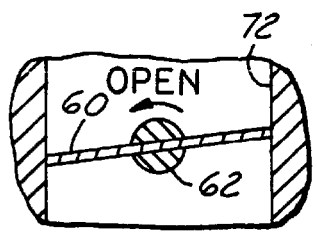

In order to overcome the force of the spring member 136 and allow the throttle plate member to be moved to its fully closed position, the motor 40 is operated. The motor, through the gear train mechanism 100 turns or rotates the sector gear which in turn rotates the throttle shaft and closes the valve plate member 60. The motor forces the stop shoulder 164 against the plunger member 134 and moves the plunger member to its depressed position 134'. The position of the sector gear 104 and plunger member at this point in operation is shown in FIG. 10. The corresponding fully closed position of the throttle plate member 60 is shown in FIG. 10A.

In the event of an electronic failure in the throttle control assembly 20 when the throttle plate member is closed or almost closed, the failsafe mechanism will automatically act to open the throttle plate to the default or "limp-home" position. The force of the spring biasing member 136 on the plunger member will return the plunger member to its undepressed position, thus forcing the sector gear member 104 (and throttle shaft member 62) to rotate slightly and open the throttle valve.

In the failsafe position of operation, the throttle plate 60 is at a slightly opened position, as shown in FIG. 9A. In such a position, the throttle valve allows some air to flow through the passageway 72, thus allowing the engine sufficient inlet air in order to operate the engine and for the vehicle to "limp-home".

With the use of two springs 150 and 136, the throttle shaft member 62 (and thus the throttle valve plate member 60) is biased in all directions of operation of the throttle control valve system toward the default or limp-home position. The throttle plate member is biased in all directions, except when it is in the default position, at which point the sector gear is prevented from further rotation by the plunger member 130.

With the present invention, the position of the plunger mechanism 130 in the housing can be adjusted (by the mating threaded relationship) in order to change or adjust the default position of the throttle plate member as desired. In addition, the plunger body limits the movement of the throttle plate in the closed position. This prevents sticking, binding, or "jamming" of the throttle valve plate member in the air passageway.

FIGS. 12 and 13 also show alternate aspects of the invention. As shown in FIG. 12, the cover member 24 can have a ridge member 202 positioned on one side adjacent to the outer edge 204. The ridge member is adopted to hold an appropriate gasket or sealing member 208 in place and to mate with the upper edge 206 of the housing 22 (see FIG. 3). As shown in FIG. 13, a rigid bushing member 210 can also be positioned in one or more of the mating openings 120 in the cover member 24 and sockets 122 in the housing 22. The bushing member 210 prevents overtightening of fastener 31 to insure that the TPS 32 in the cover member is accurately spaced relative to the magnet 116 in central member 114 of the sector gear.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:
1. A valve assembly comprising:
a housing;
a fluid passageway in said housing;
a shaft member rotatably positioned in said housing and extending through said fluid passageway;
a valve member positioned in said fluid passageway, said valve member attached to said shaft member and rotatable therewith;
a gear mechanism for rotating said shaft member between a first position in which said valve member is oriented to allow full passage of fluid in said passageway, and a second position in which said valve member is oriented to prevent fluid passage in said passageway;
a motor member operably connected to said gear mechanism for causing said gear mechanism to rotate said shaft member;
a spring member for biasing said gear mechanism and shaft member in a direction away from said first position and toward said second position; and
a spring-biased plunger mechanism for biasing said gear mechanism and shaft member in a direction away from said second position and to a third default position between said first and second positions;
wherein in the event of non-operation of said motor member, said spring member and plunger mechanism act to position said shaft member in said third position.

2. The valve assembly of claim 1 further comprising electronic means for operating said motor member.

3. The valve assembly of claim 2 further comprising a cover member on said housing, at least a part of said electronic means positioned in said cover member.

4. The valve assembly of claim 1 wherein said gear mechanism comprises at least a first gear member connected to said motor and a second gear member attached to said shaft member.

5. The valve assembly of claim 4 further comprising a third gear member positioned between said first and second gear members.

6. The valve assembly of claim 4 wherein said spring member is biased between said second gear member and said housing.

7. The valve assembly of claim 6 wherein said spring member is a helical torsion spring member.

8. The valve assembly of claim 1 wherein said spring-biased plunger mechanism comprises a body member, a second spring member and a plunger member.

9. The valve assembly of claim 4 further comprising a stop member on said second gear member, said stop member positioned to limit rotation of said gear mechanism and thus said shaft member.

10. An electronic throttle control assembly comprising:
a housing;
an air passageway in said housing;
a throttle shaft member rotatably positioned in said housing and extending through said air passageway;
a throttle plate member attached to said throttle body shaft and positioned in said air passageway;
said throttle plate member rotatably between a first position preventing air from passing through said air passageway and a second position allowing a full compliment of air to pass through said air passageway;
a motor positioned in said housing having a rotatable motor shaft;

a gear assembly positioned in said housing, said gear assembly comprising at least a first gear member attached to said motor shaft and a second gear member attached to said throttle shaft member;

wherein operation of said motor rotates said throttle plate between said first position and said second position;

a first spring member positioned between said housing and said second gear member, said first spring member biasing said throttle shaft member away from said second position and toward said first position;

a default means positioned in said housing, said default means comprising a spring-biased plunger mechanism;

said plunger mechanism biasing rotation of said throttle body shaft toward a third position of said throttle plate between said first and second positions;

wherein in the event of failure of said motor, said throttle plate will be rotated to said third position and allow limited passage of air through said air passageway.

11. The throttle control assembly of claim 10 further comprising a third gear member operably positioned between said first and second gear members.

12. The throttle control assembly of claim 10 further comprising a stop member on said second gear member, said stop member positioned to contact said spring-biased plunger mechanism.

13. The throttle control assembly of claim 10 wherein said spring-biased plunger mechanism comprises a body member, a second spring member and a plunger member.

14. The throttle control assembly of claim 13 wherein said plunger mechanism further comprises a device for adjusting the third position of said throttle plate.

15. The throttle control assembly of claim 10 wherein said plunger mechanism further comprises a device for adjusting the closed stop of said throttle plate.

* * * * *